United States Patent Office 3,698,875
Patented Oct. 17, 1972

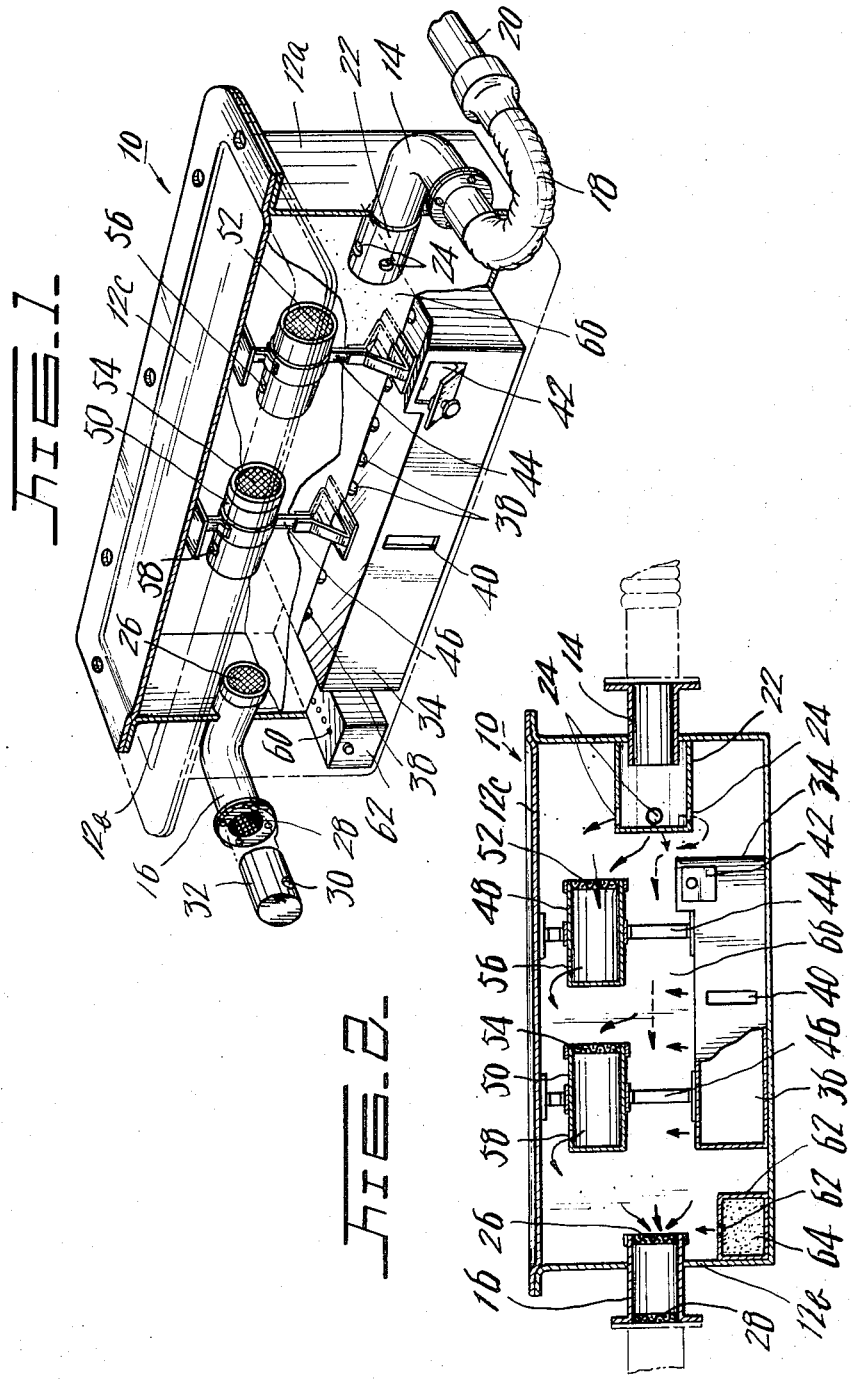

3,698,875
DEVICE FOR CLEANING EXHAUST GAS FROM INTERNAL COMBUSTION ENGINE
Susumu Yamada, 36–15, 1-chome, Amanuma, Tokyo, Japan
Filed May 13, 1970, Ser. No. 36,714
Int. Cl. B01d 39/00, 53/02
U.S. Cl. 23—288 F                             8 Claims

ABSTRACT OF THE DISCLOSURE

A device for cleaning the exhaust gas from an internal combustion engine comprising a housing packed with powder or chips of metals, a reservoir in the housing containing a suitable emulsion which is vaporized by the heat of the exhaust gas, the contaminants such as carbon, lead, tar, etc. being trapped by the packed powder or chips and adhered thereto by the heat of the exhaust gas, cylindrical hollow bodies each having a filter having a catalytic action, the harmful gases contained in the exhaust gas being converted into harmless carbon dioxide by said filter and the vapor of the emulsion, and a storage containing therein activated carbon for removing the odour from the exhaust gas, whereby the exhaust gas is cleaned and discharged from the housing.

BACKGROUND OF THE INVENTION

The present invention relates to a device for cleaning the harmful exhaust gas from an internal combustion engine so as to discharge the cleaned, odourless and harmless gas into the surrounding atmosphere.

The exhaust gas from the internal combustion engine of an automobile contains carbon monoxide, sulfur dioxide, nitrogen oxides, etc. which are all harmful to animals and plants. Especially carbon monoxide is extremely poisonous. As little as 9 parts of the gas in 10,000 parts of air cause nausea and headache, and slightly larger amounts will cause death. The air pollution is increased by the exhaust gas containing carbon, lead and other contaminants, especially in the urban areas. To solve this problem, there have been proposed an afterburner process in which the exhaust gas is burnt again; a chemical reaction process in which undesired constituents are removed by chemical reactions, and so on. Some of these proposals are used in the practice, but are not satisfactory in view of their performances and costs.

SUMMARY OF THE INVENTION

It is therefore the primary object of the present invention to provide a device for cleaning the exhaust gas from an internal combustion engine, which device is simple in construction, manufacture and maintenance, and is inexpensive and has a long service life. The present invention is characterized in that a housing of the device is packed with fillers or filter medium such as powder or chips of aluminum, nickel, copper, brass, iron or a mixture thereof; a reservoir disposed in the housing contains an emulsion consisting of soap water, sodium carbonate and dried sodium sulfate or soap water, sodium bicarbonate and dried sodium sulfate; the emulsion is evaporated by the heat of the exhaust gas so that the fillers or filter medium become viscous and trap the contaminants such as carbon, lead, tar, etc. and adhere them to the fillers or filter medium by the heat of the exhaust gas; evaporated water combines with nitrogen monoxide into nitrogen dioxide which in turn combines with sodium carbonate or sodium bicarbonate in the vapor of the emulsion, thereby forming a large quantity of carbon dioxide; carbon dioxide thus formed is mixed with sulfur dioxide so as to dilute the same; hollow cylindrical bodies having filters having the catalytic action are disposed in the upper portion of the housing so that carbon monoxide contained in the exhaust gas is mixed with said large quantity of carbon dioxide and then converted into carbon dioxide; and a storage of activated carbon is disposed adjacent to the outlet of the housing so that the odour of the exhaust gas may be removed, whereby the cleaned, odourless and harmless gas may be discharged into the surrounding atmosphere.

The above and other objects, features and advantages of the present invention will become more apparent from the following description of the preferred embodiment thereof, taken in conjunction with the accompanying drawing.

BRIEF DESCRIPTION OF THE DRAWING

FIG. 1 is a perspective view of one embodiment of a cleaning device in accordance with the present invention with one side wall of its housing being removed in order to illustrate the interior; and FIG. 2 is a longitudinal sectional view thereof.

DESCRIPTION OF THE PREFERRED EMBODIMENT

Referring to FIGS. 1 and 2, a cleaning device comprises a hermetically sealed housing 10 having suitable dimensions. The housing 10 has a cover fixed at a suitable side depending upon how the housing is mounted upon an automobile.

Pipe joints 14 and 16 are extended from opposing vertical walls 12a and 12b, respectively. The pipe joint 14 extending from the side wall 12a has its one end joined to a muffler 20 of the automobile by a metallic flexible pipe. The other end of the pipe joint 14 inside the cleaner housing 10 is covered with a cylindrical cover 22 having four holes 24 equiangularly formed through the side wall thereof. Thus, the exhaust gas from the engine of the automobile is introduced into the cleaner housing 10 through the muffler 20, the metallic flexible pipe 18, the pipe joint 14 and the four holes 24 of the cylindrical cover 22. Filters 26 and 28 are fixed to both ends of the joint 16. An exhaust pipe 32 which is fixed to the outer end of the pipe joint 16 has a plurality of holes 30 formed through the lower side wall thereof adjacent to the outer end. Thus, the cleaned gas is discharged from the cleaner housing 10 into the surrounding atmosphere through the pipe joint 16, the pipe 32 and its holes 30.

If required, the catalyst having a coarse particle size may be disposed between the filters 26 and 28 in the pipe joint 16.

A reservoir 34 disposed upon the bottom of the cleaner housing 10 contains therein the emulsion 36 consisting of soap water, sodium carbonate and dried sodium sulfate or soap water, sodium bicarbonate and dried sodium sulfate. A plurality of holes 38 are formed through the top of the reservoir 34 so that the vapor evolved by the temperature rise of the emulsion 36 due to the heat of the exhaust gas may be delivered into the cleaner housing 10 through the holes 38. A level gage 40 for checking the level of the emulsion 36 in the reservoir 34 and an inlet 42 for supplying the emulsion 36 are provided. Hollow cylindrical bodies 48 and 50 are supported by posts 44 and 46, respectively, between the reservoir 34 and the top wall 12c of the cleaner housing 10. These hollow cylindrical bodies 48 and 50 have filters 52 and 54 fixed to the ends facing the pipe joint 14 or the inlet of the waste, these filters 52 and 54 having a catalytic action of converting carbon monoxide into carbon dioxide. The other ends of these cylindrical bodies 48 and 50 are closed, but ports 56 and 58 are formed through the upper side walls of these cylindrical bodies 48 and 50 so as to discharge the gas from the bodies into the cleaner housing 10. In the instant embodiment, both of the cylindrical bodies 48 and 50 have the filters 52 and 54 having the catalytic action, but if required, the filter 52 may be dispensed with. A storage 62 containing therein activated carbon 64 is disposed upon the bottom of the cleaner housing 10 adjacent to the side wall 12b. Into the space within the cleaner housing 10 except the reservoir 34, the cylindrical bodies 48 and 50 and the storage 62 are packed the fillers 66 such as powder or chips of aluminum, nickel, copper, brass, iron or mixtures thereof. Therefore, the gases flowing through the cylindrical bodies 48 and 50 meet less resistance than those passing through these fillers 66.

Next the mode of operation will be described.

The exhaust gas introduced into the cleaner through the muffler 20, the flexible pipe 18 and the pipe joint 14 is branched into two flows indicated by the solid line arrows and the chain line arrows. More specifically, the light weight gas carrying carbon particles flows as indicated by the solid line arrows while the heavy weight gas carrying tar flows, as indicated by the chain line arrows. The light weight gas flows toward the cylindrical body 48 in which the resistance is less while the heavy weight gas flows toward the reservoir 34. The reservoir 34 is heated by the heat of the exhaust gas so that the emulsion 36 is immediately evaporated.

Thus, the vapors of the emulsion 36 are introduced into the cleaner body 10 through the holes 38 at the top of the reservoir 34 and attached to the fillers 66. The carbon particles and the contaminants such as tar, lead, etc. are trapped or filtered by and adhered or sintered to the fillers 66 because they are elevated at a high temperature by the exhaust gas. The water in the vapor of the emulsion 36 combines with nitrogen monoxide, thereby forming nitrogen dioxide. Nitrogen dioxide so formed further combines with sodium carbonate or sodium bicarbonate in the vapor, thereby forming a large quantity of carbon dioxide. Therefore, sulfur dioxide in the exhaust gas may be diluted. The light weight gas flowing in the direction indicated by the solid line arrows is mixed with carbon dioxide and then flows into the cylindrical body 48. The gas is discharged from the port 56 and then flows into the cylindrical body 50 from which it is discharged via the port 58. In this case, carbon monoxide contained in the light weight gas is changed into harmless carbon dioxide. The gas is directed toward the pipe joint 16. The contaminants contained in the heavy weight gas flowing in the direction indicated by the chain line arrows are trapped by the fillers so that a portion of the heavy weight gas which becomes now the light weight gas may flow toward the cylindrical bodies 48 and 50. In similar manner as described above, carbon monoxide contained in the gas may be changed into harmless carbon dioxide.

The odors in the gas may be removed by activated carbon 64 in the storage 62. The gas flowing into the pipe joint 16 may be further filtered by the filters 26 and 28 so that the now odorless and harmless gas may be discharged through the holes 30 of the pipe 32.

The present invention has been so far described with particular reference to the one preferred embodiment thereof, but it will be understood that variations and modifications can be effected without departing from the true spirit of the present invention as described hereinabove and as defined in the appended claims.

What is claimed is:

1. In an automobile having a combustion engine, in combination, a first pipe adapted to receive hot combustion gases from said combustion engine and having an outlet, and a second pipe adapted to communicate with the atmosphere and having an inlet;

a housing having a top, a bottom and a pair of side walls;

a first pipe joint installed in one of said side walls and communicating with said outlet and the interior of said housing, and a second pipe joint installed in the other of said side walls and communicating with said inlet and the interior of said housing;

a reservoir provided at said bottom of said housing and accommodating an aqueous emulsion capable of evaporating upon being heated by said hot combustion gases;

hollow cylindrical bodies in said housing and each having a circumferential wall provided with an open end and a closed end, and with an upwardly directed port in the region of said closed end;

mounting means mounting said hollow cylindrical bodies intermediate said reservoir and said top of said housing;

a filter capable of catalytically converting carbon monoxide to carbon dioxide and extending across at least one of said open ends;

odor-removing means at said bottom adjacent to said second pipe joint for removing odor from gas leaving said housing through said second pipe joint;

vent aperture means provided in said second pipe adjacent said inlet thereof; and filler means filling the interior of said housing except for said reservoir, cylindrical bodies and odor-removing means, said filler means consisting particulate material selected from the group composed of aluminum, nickel, copper, brass, iron and mixtures thereof.

2. A combination as defined in claim 1, wherein said aqueous emulsion is composed of soap water, sodium carbonate and dried sodium sulfate.

3. A combination as defined in claim 1, wherein said aqueous emulsion is composed of soap water, sodium bicarbonate and dried sodium sulfate.

4. A combination as defined in claim 1; and further comprising a level gauge provided on said reservoir for indicating the level of said aqueous emulsion therein.

5. A combination as defined in claim 4; and further comprising inlet means on said reservoir for admitting said aqueous emulsion into the same.

6. A combination as defined in claim 1, said first pipe joint having an open end portion inside said housing; and further comprising a cover closing said open end portion and being provided with a plurality of equi-angularly spaced holes for branching said exhaust gases as the same enter said housing.

7. A combination as defined in claim 1, said second pipe joint having two spaced open end portions; and further comprising filter means provided on and extending across the openings of both of said open end portions.

8. A combination as defined in claim 7; and further comprising coarse particulate catalyst means located in said second pipe joint intermediate said open end portions and said filter means.

References Cited

UNITED STATES PATENTS

| | | | |
|---|---|---|---|
| 1,040,914 | 10/1912 | Farmer | 55—Dig. 30 |
| 2,083,132 | 6/1937 | Williams et al. | 55—524 X |
| 2,145,898 | 2/1939 | Simpson | 55—524 |
| 2,178,614 | 11/1939 | Slayter | 252—88 X |
| 2,347,031 | 4/1944 | Cupery | 55—524 |
| 2,409,825 | 10/1946 | Baringoltz | 23—288 F UX |
| 2,737,260 | 3/1956 | Jenison | 23—288 F UX |

(Other references on following page)

UNITED STATES PATENTS

| | | | |
|---|---|---|---|
| 2,789,032 | 4/1957 | Bagley et al. | 55—Dig. 30 |
| 2,795,103 | 6/1957 | Jenison | 23—2 E X |
| 3,032,968 | 5/1962 | Novak et al. | 23—2 E X |
| 3,116,969 | 1/1964 | Coleman, Jr. | 21—74 |
| 3,254,966 | 6/1966 | Bloch et al. | 23—2 E X |
| 3,383,854 | 5/1968 | White | 60—29 |
| 3,415,056 | 12/1968 | Farrell | 60—30 R |
| 3,566,583 | 3/1971 | Ashmore | 55—255 |

FOREIGN PATENTS

| | | | |
|---|---|---|---|
| 425,059 | 3/1911 | France | 55—233 |

DENNIS E. TALBERT, JR., Primary Examiner

U.S. Cl. X.R.

23—2.5, 2 E, 284; 55—233, 259, 267, 279, 308, 316, 318, 387, 419, 476, 482, 512, 522, DIG. 30; 60—297, 299, 310, 311